United States Patent
Wager (10) Patent No.: US 8,600,410 B2
(45) Date of Patent: Dec. 3, 2013

(54) WIRELESS NETWORK WITH ADAPTIVE AUTONOMOUS LOCATION PUSH

(75) Inventor: Garrick Wager, Arvada, CO (US)

(73) Assignee: Unwired Planet, LLC, Reno, NV (US)

( * ) Notice: Subject to any disclaimer, the term of this patent is extended or adjusted under 35 U.S.C. 154(b) by 1020 days.

(21) Appl. No.: 11/495,329

(22) Filed: Jul. 28, 2006

(65) Prior Publication Data

US 2007/0026871 A1    Feb. 1, 2007

Related U.S. Application Data

(60) Provisional application No. 60/704,100, filed on Jul. 28, 2005.

(51) Int. Cl.
*H04W 24/00* (2009.01)
*H04L 12/58* (2006.01)
*H04B 7/00* (2006.01)

(52) U.S. Cl.
USPC .............. 455/456.3; 455/456.1; 455/412.1; 455/456.2; 455/456.5; 455/457; 370/310

(58) Field of Classification Search
USPC .............................. 455/456, 456.1
See application file for complete search history.

(56) References Cited

U.S. PATENT DOCUMENTS

| | | | |
|---|---|---|---|
| 6,650,902 B1 * | 11/2003 | Richton | 455/456.3 |
| 6,975,873 B1 * | 12/2005 | Banks et al. | 455/456.5 |
| 2004/0156326 A1 * | 8/2004 | Chithambaram | 370/310 |
| 2004/0266398 A1 * | 12/2004 | Adamczyk et al. | 455/412.1 |
| 2005/0040944 A1 * | 2/2005 | Contestabile | 340/539.13 |
| 2006/0025158 A1 * | 2/2006 | Leblanc et al. | 455/456.2 |
| 2006/0107008 A1 * | 5/2006 | Ghanem et al. | 711/163 |
| 2006/0142027 A1 * | 6/2006 | Krishnamurthi et al. | 455/457 |

* cited by examiner

*Primary Examiner* — Wayne Cai
*Assistant Examiner* — Timothy Pham
(74) *Attorney, Agent, or Firm* — Sheppard, Mullin, Richter & Hampton LLP (57) ABSTRACT

A method of providing location-based services includes transmitting a first location criterion from a wireless network server to a wireless device. The method also includes evaluating whether a physical location of the wireless device satisfies the first location criterion. The process of evaluating is performed in part using the wireless device. When the first location criteria is satisfied, the method further includes transmitting an indication from the wireless device to the server that the first location criterion has been satisfied.

30 Claims, 6 Drawing Sheets

WIRELESS NETWORK WITH ADAPTIVE AUTONOMOUS LOCATION PUSH

This application claims priority to U.S. Provisional Application No. 60/704,100, entitled "Wireless Network with Adaptive Autonomous Location Push," filed on Jul. 28, 2005, commonly assigned, and hereby incorporated by reference in entirety.

BACKGROUND OF THE INVENTION

This invention relates generally to the field of wireless communication systems, and more particularly to a method and system for providing location-based services efficiently on a wireless communication network.

Wireless communication networks operate to communicate information, such as voice signals, images, electronic files or data, video signals, and the like, to and from a wireless communication device using radio waves. For example, the wireless communication network may include a communication system using analog, digital cellular, or PCS communication systems, a satellite communication system, a two-way radio communication system, a paging system, and the like.

A wireless communication network typically includes a network of base stations that can communicate with the various wireless communication devices. Examples of wireless communication devices include mobile phones and other telephony devices, radios, personal digital assistants (PDAs), palmtops, notebook computers, and other devices that have wireless communication capability. Each base station provides communication services within its respective network zone, such that the network of base stations provides a number of network zones that can cover a large geographic area. The network zones and their respective coverage areas occasionally change as base stations are improved and added within the wireless communication network. In the United States, cellular communication networks now cover nearly all of the United States, with many of the base stations now providing digital and PCS communication systems.

More recently, a number of location-based service applications have been implemented or proposed for wireless communication networks. Examples of such existing or proposed location-based service applications include: emergency service, location-dependent call routing, location-dependent billing, location tracking, and the like. In emergency applications, the call and the exact location of the wireless communication device may be routed to the closest provider of emergency services, thus reducing emergency response time and possibly saving lives. In location-dependent billing applications, different billing rates may be charged to a customer for operating the wireless communication device in different geographical areas. Each location-based service application utilizes the location of the wireless communication device.

Location systems sometimes utilize conventional system reference location methods for determining or characterizing the location of the wireless communication device. Such reference location methods operate by relating the location of the wireless communication device to a network zone, e.g., cell or cell sector of the wireless communication network. However, mobile operators face specific and real problems with network resources that may hinder widespread deployment of commercial location-based services. For example, consider a situation where a mobile operator is offering a mix of location-based services to its subscribers. The application mix includes services like fleet tracking, child finder, push advertising, and traffic alerts. These applications generally would like to be notified with location updates when the subscriber is moving, and perhaps with greater frequency when the subscriber is moving more rapidly.

One approach for providing location updates is to do polling, either by the application or by a location management program. Now consider a situation where one million subscribers have signed up for the location-based services and the quality of service (QoS) requirements of the application mix are, on average, that each subscriber's location is polled every 5 minutes. Based on these considerations, this equates to about 200,000 location determination transactions per minute or 3333 transactions per second (TPS). Also, there is typically considerable latency associated with determining a location with technology like A-GPS. Therefore, the applications (and perhaps a human operator) are polling frequently and waiting a long time.

In a typical case, continuous polling may use resources unnecessarily because large percentage of these location transactions may be unnecessary because the subscriber has not moved. For example, workers may be sitting in an office for several hours, plumbers on a job for hours at a time, or the like. The subscriber may be so distant from a point of interest (for push advertising, for example) that there is no need to do a location fix at all.

Therefore, there is a need to provide a method and system for efficient location determination and reporting capabilities in wireless networks, especially to save network resources such as radio frequency bandwidth and server capacity, and battery life in the wireless communication devices.

SUMMARY OF THE INVENTION

The invention provides location determination and reporting capabilities utilizing network resources in an efficient manner. An implementation of the invention is called adaptive autonomous location push (AALP). AALP directly leverages the increasing capabilities of mobile phones to enable more powerful and compelling location-based applications. A feature of AALP is a "mobile agent" resident in the mobile device. The mobile agent is responsible for autonomously monitoring its location using adaptive algorithms and comparing the location versus a downloaded database of push criteria. When the agent detects its current location meets one of its push criteria it pushes its location to the location manager (LM) program or system for subsequent distribution to interested applications. The adaptive nature of the mobile agent means a location is determined only when necessary, saving network resources such as radio frequency bandwidth and server capacity, and battery life in the phone.

At the same time the mobile agent provides a higher-level quality of service (QoS) than polling generally allows because location updates can be delivered more frequently when necessary (e.g., when the subscriber is moving rapidly). The latency for location transactions is reduced or eliminated because either: (1) There is no request for location. Instead the location update is pushed to the application when the criterion is met. (2) The current location is already in the location manager cache when a request arrives so response is immediate.

Ultimately, the mobile agent and its adaptive algorithms allow the carrier to offer high QoS location services while making efficient use of network resources such as PDE and radio spectrum.

There are many applications that would benefit from AALP. Some examples include: (1) fleet tracking, (2) push advertising, (3) traffic alerts, (4) driving directions, (5) child finder, and (6) friend finder.

AALP takes advantage of the widespread deployment of more advanced phones ("smart phones") with high accuracy location capabilities. The number of smart phones in circulation is growing rapidly (and predicted to grow even more rapidly in the near future) and mobile operators want to exploit the capabilities of these advanced phones to offer premium services at a premium price above and beyond basic voice service. While not all smart phones will have GPS support, many will. In fact, all of one wireless phone service provider's new phones sold after December 2004 will be GPS enabled. Hence, the market opportunity surrounding smart phones is very strong and represents a very valuable market segment for the mobile operators.

In an embodiment, the invention is a method including in a wireless device, receiving a first location criteria from a wireless network server. The method further includes using the wireless device, evaluating whether a physical location of the wireless device satisfies the first location criteria. The method further includes when the first location criteria is satisfied, using the wireless device to provide an indication to the server that the first location criteria has been satisfied.

In another embodiment, the invention is a method including in a wireless device, receiving a first landmark criterion and a second landmark criterion from a wireless network server. The wireless device evaluates whether a physical location of the wireless telephony device satisfies the first landmark criterion. The wireless device evaluates whether a physical location of the wireless device satisfies the second landmark criterion. If the first landmark criterion is satisfied, the wireless device provides an indication to a presence server that the first landmark criterion has been satisfied. If the second landmark criterion is satisfied, the wireless device provides an indication to a presence server that the second landmark criterion has been satisfied. The presence server determines whether the wireless device has satisfied the first landmark criterion or second landmark criterion.

In a further embodiment, the invention is a method including in a wireless device, receiving a first landmark criterion from a wireless mobile agent manager server. The wireless device evaluates whether a physical location of the wireless device satisfies the first landmark criterion. If the first landmark criterion is satisfied, the wireless device transmits an indication to a presence server that the first landmark criterion has been satisfied. The presence server determines whether the wireless device has satisfied the first landmark criterion or second landmark criterion.

In a still further embodiment, the invention is a system including a location manager operating unit and a mobile agent manager operating unit, communicating with the location manager operating unit, where the mobile agent manager comprises location criteria. The system has a presence server operating unit, communicator with the mobile agent manager. The presence server operating unit receives presence information from a mobile device, and transmits location presence information to the location manager operating unit mobile agent manager, The mobile device evaluates whether the mobile device is in a location satisfying specific criteria provided to the mobile device.

In another embodiment, a method of operating a mobile unit is provided. The method includes receiving at least one presence criterion transmitted from a wireless network server to a mobile unit and storing the at least one presence criterion in a memory disposed in the mobile unit. The method also includes determining that a characteristic of the mobile unit satisfies the at least one presence criterion using an algorithm disposed in the mobile unit and transmitting a location update request from the mobile unit to the wireless network server.

Many benefits are achieved by way of the present invention over conventional techniques. For example, some embodiments provide an architecture that includes improved support for widespread commercial location based services through reduction in the network load associated with location based services. Embodiments of the present invention provide adaptive autonomous location push functionality that leverages the increasing capabilities of mobile phones to enable more powerful and compelling location-based applications. In an embodiment, a mobile agent resident in a mobile device autonomously monitors its location using adaptive algorithms and compares or evaluates the location versus a downloaded database of push criteria. When the agent detects its current location meets one of its push criteria, the agent pushes its location to a location manager program or system for subsequent distribution to interested applications. The adaptive nature of the mobile agent saves network resources such as radio frequency bandwidth and server capacity, and battery life in the phone. These and other benefits will be described in more detail throughout the present specification and more particularly below in conjunction with the following drawings.

DETAILED DESCRIPTION OF SPECIFIC EMBODIMENTS

Figure 1:
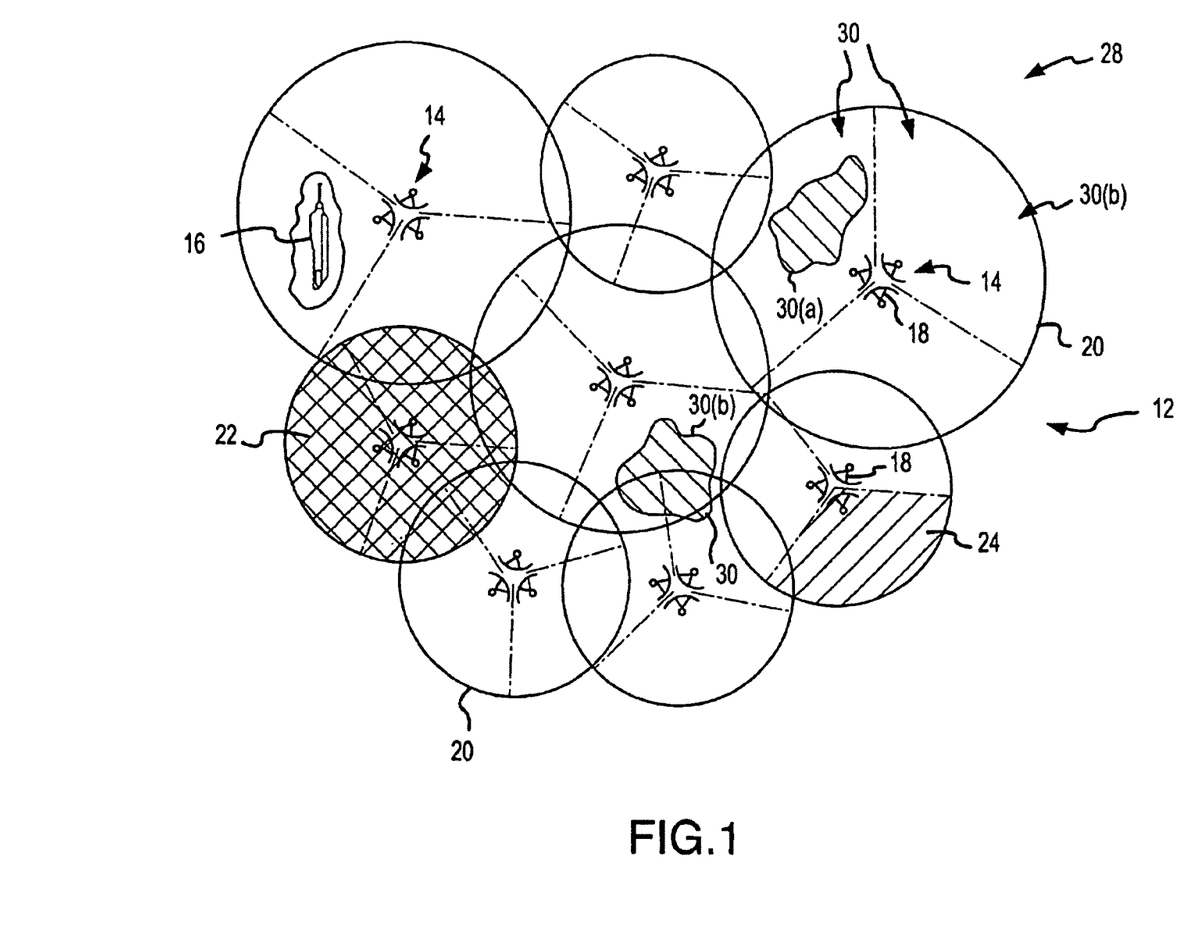
FIG. 1 an operating environment of a location-based zone assignment system for a wireless communication system.

FIG. 1 shows an operating environment of a location-based zone assignment system for a wireless communication network 12, within which the invention may be embodied. For purposes of illustration, the wireless communication network 12 is shown as a cellular communications network. However, it will be understood that the wireless communication network 12 may include other types of wireless communication networks without departing from the scope of the present invention. For example, the wireless communication network 12 may include a satellite communication network, a two-way radio communication network, or any other suitable wireless communication network.

Referring to FIG. 1, the wireless communication network 12 includes a number of base stations 14 that can communicate with a wireless communication device 16. Each communication between the wireless communication device 16 and the base stations 14 will be referred to generally as a call, although it will be appreciated that a location determination may be based on periodic polling, power on, or other signals from the wireless communication device 16. Each base station 14 includes an antenna system 18 that operates to transmit and receive radio frequency signals from each operating wireless communication device 16 within the base station's 14 respective network zone 20. Each network zone 20 has an associated coverage area 22 that depends upon the signal strength and signal sensitivity of the base station 14, as well as environmental conditions, such as geography and the characteristics of the associated wireless communication device 16.

Although the network zones 20 are shown as being generally circular for purposes of illustration, it will be appreciated the shapes of the coverage areas can vary. Moreover, a cell's coverage area may be divided into sectors (e.g., three 120 degree sectors) that are serviced by separate antenna. In general, the greater the signal strength and signal sensitivity, the larger the potential coverage area 22 of the network zone 20. The base stations 14 are geographically positioned over large areas to form a network of network zones 20 having interlaced coverage areas 22. As the wireless communication device 16 moves from one network zone 20 to another network zone 20, the base stations 14 communicate with one another to hand-off the call from the wireless communication device 16, thereby maintaining the call.

Typically each base station 14 can handle only a limited number of calls at any one time. For this and other reasons, the number of base stations 14 in a given geographical area generally depends upon the number of calls, i.e., call traffic, that is generated within that geographical area. For example, in high-density population areas where the call traffic is high, a large number of base stations 14 with overlapping interlaced coverage areas 22 may be utilized. Conversely, in low-density population areas where the call traffic is low, fewer numbers of base stations 14 are required and the coverage areas 22 are minimally interlaced.

Wireless communication networks 12 also utilize various types of communication technologies to communicate with the wireless communication device 16. Specifically, the wireless communication networks 12 utilize some form of an analog or digital communication technology, such as conventional analog, digital, and PCS communication technologies, for communicating with the wireless communication device 16. Digital communication technology may be preferred to analog communication technology because digital communication technology can handle higher levels of call traffic, as well as providing enhanced services, such as clearer sound quality. Accordingly, analog base stations 14 may be replaced by or coupled with digital base stations 14 to satisfy customer demands for improved services and to meet call traffic requirements.

The wireless communication network 12 may frequently change as a result of competition, demographic, and population changes, as well expansion of the geographical area covered by the wireless communication network 12. In particular, the configuration of the wireless communication network 12 changes as base stations 14 are added and upgraded with improved communication and transceiver technologies. The changes in the configuration of the wireless communication network 12 directly affect the network zones 20 and their respective coverage areas 22. As will be discussed in greater detail below, the changing configuration also directly affects location-based service applications that utilize location information that describes the location of the wireless communication device 16 relative to the network zones 20.

Figure 2:
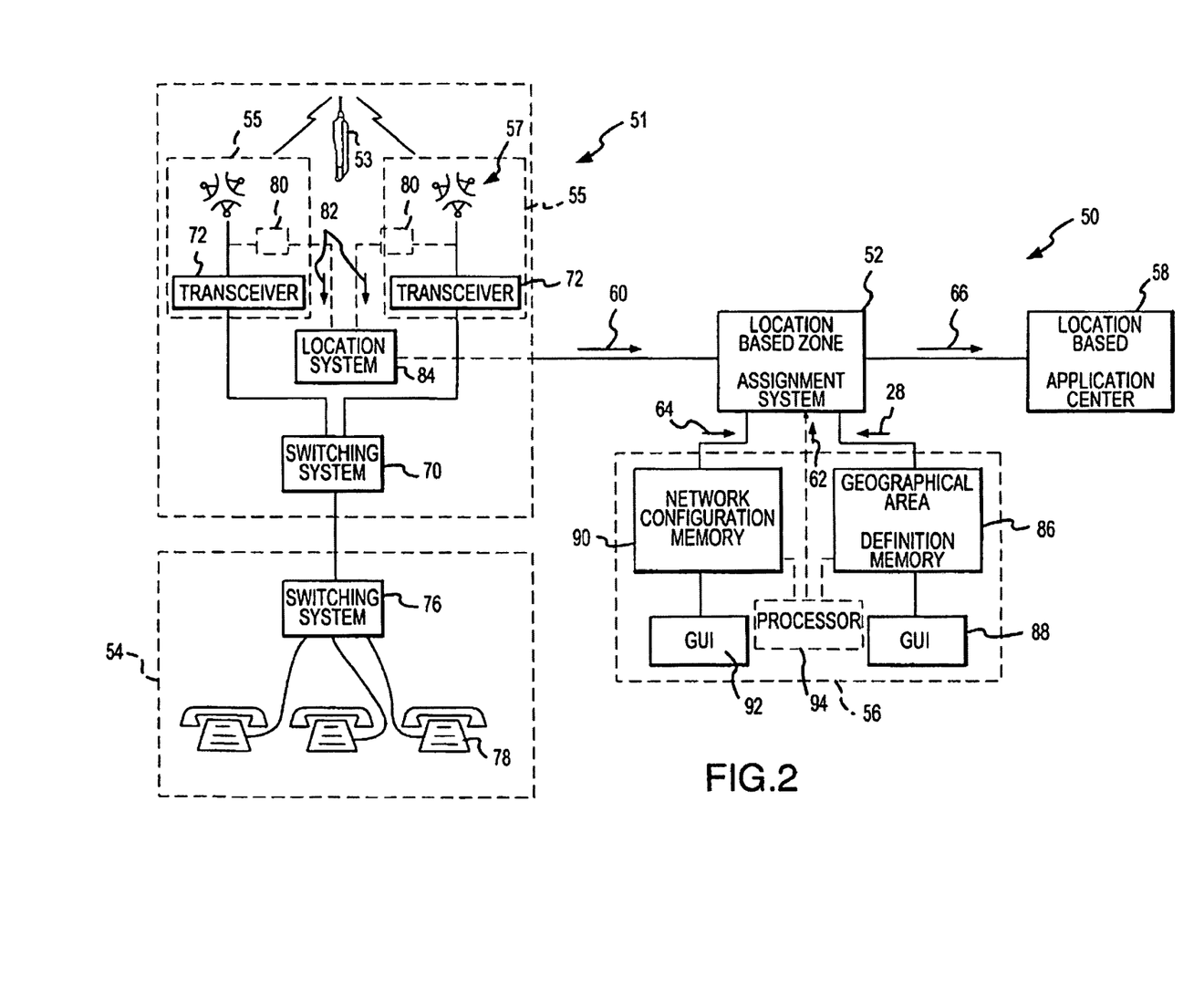
FIG. 2 shows a simplified communication system utilizing a location-based zone assignment system for the wireless communication network of FIG. 1.

One type of location system, described in detail in FIG. 2, identifies the location of the wireless communication device 16 relative to the various network zones 20 and their respective coverage areas 22. Various types of location systems for providing a location of the wireless communication device 16 have been implemented or proposed. Depending on the type of location system, the location may be determined by equipment within the wireless communication device 16, by logic resident at the base station 14, on a switch, or on a separate platform within the wireless communication network 12. In other location systems, no dedicated location finding equipment is required. For example, in cell or sector location systems, the approximate location of the wireless communication device 16 is determined based on the cell sector that is handling communications with the wireless communication device 16. Such cell or sector identification information is already encoded into network communications.

An embodiment of a cell or sector location system is illustrated in FIG. 1. In the embodiment illustrated, the antenna system 18 is divided into three separate antennas with each antenna responsible for a sector 24. As illustrated in FIG. 1, the coverage area 22 of each cell is the sum of the coverage areas of the three antennae, where the coverage area of each antenna is approximately 120 degrees. Utilizing only cell or sector location techniques, the location of the wireless communication device 16 can be narrowed down to a specific sector 24 of a specific base station 14 within the wireless communication network 12. Additional location methods may be employed to further refine the location of the wireless communication device 16. For example, time difference of arrival (TDOA) methods may be used to determine the approximate distance the wireless communication device 16 is from the antenna system 18. The accuracy and nature of the location information are determined by the particular locating method.

Some examples of location-based service applications include certain billing applications utilizing a record that is based on the location of the wireless communication device 16 relative to a geographical area definition. The geographical area definition includes a defined set of geographical boundaries, coordinates, cell sectors, grid elements, and the like, that define specific operating zones 30. For example, in location-dependent billing applications using a cell/sector location system, predefined operating zones 30 having different billing rates are created. In practice, the cell sector of a residence of a user can be defined as a primary operating zone 30(*a*) and the area outside of the primary operating zone 30(*a*) can be defined as a general operating zone 30(*b*). In this example, when the user places a call from within the primary operating zone 30(*a*), the user is charged a first billing rate, e.g., a billing rate comparable to a typical land line, whereas, when a call is placed from the general operating zone 30(*b*), the user is charged a second billing rate, e.g., the normal billing rate for that carrier or calling plan.

Additional operating zones 30 can be defined in the geographical area definition 28. For example, the business location of the user can be defined as a secondary operating zone 30(*c*), with a billing rate commensurate with business calls. It will be understood that other suitable types of location-based service applications may be used without departing from the scope of the present invention. For example, location-based service applications may be used to route calls to or provide information regarding the nearest pizza delivery, car towing service, and motel, as well as provide position information for vehicle alarms and emergencies.

FIG. 2 shows an embodiment of a simplified communication system 50 utilizing a location-based zone assignment system 52. The simplified communication system 50 includes a wireless communication network 51, an external communications system 54, a wireless communication network data center 56, a location-based application center 58, and the location-based zone assignment system 52. Although the communication system 50 is illustrated with the wireless communication network 51, the wireless communication network data center 56, the location-based application center 58, and the location-based zone assignment system 52 as separate and distinct components, it will be understood that portions of these components may reside on a platform associated with the switching system 70 (not expressly shown).

In general, the wireless communication device 53 communicates with the external communications system 54 through the wireless communication network 51. As discussed previously, the wireless communication network 51 determines the location of the wireless communication device 53 within the wireless communication network 51. The wireless communication network 51 provides location information 60 which can be accessed by the location-based zone assignment system 52 in either real time or on a time delayed basis. For network based location systems such as cell or cell sector systems, the location information may include a cell or sector identifier. For other systems, if it is desired to express the user's location in terms of network topology, the location-based zone assignment system 52 can obtain a current network area definition 62 for correlation with the location information 60.

As noted above in connection with FIG. 2, specific location-based services application such as location based billing applications operated based on an operating zone definition defining one or more operating zones (e.g., a home billing zone, a work billing zone and a general billing zone). In some implementations, the operating zone definition is stored in terms independent of network topology, and is interpreted in terms of a current network topology at the time of making a location determination. In this manner, detailed zone definitions do not need to be revised in the event of changes in network topology.

Figure 3:
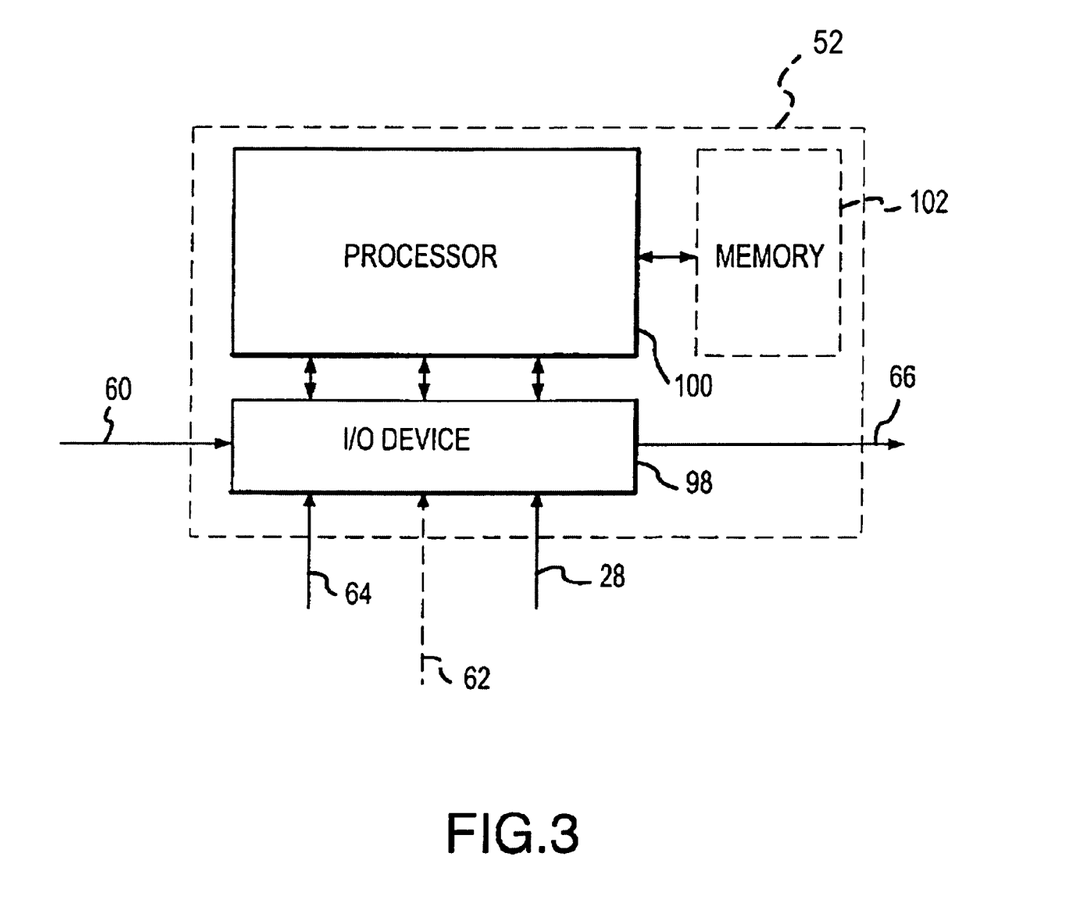
FIG. 3 shows a location-based zone assignment system as shown in FIG. 2.

FIG. 3 shows one embodiment of the location-based zone assignment system 52 of FIG. 2. The location-based zone assignment system 52 includes an input/output device 98, a processor 100, and a memory 102. In one embodiment, as illustrated with solid lines, the input/output device 98 receives the location information 60. The location information 60 is relayed to the processor 100. The processor 100 then requests and receives the current network configuration definition 64 and the geographical area definition 28. The processor 100 translates the geographical area definition 28 into the current network area definition 62 using the current network configuration definition 64. The processor 100 applies a comparative algorithm to the location information 60 and the current network area definition 62 to determine which operating zone the wireless communication device 53 is operating within during the call. The processor 100 repetitively compares the location information 60 to the current network area definition 62 for each relevant time period. The processor 100 assigns a record 66 that contains information regarding which operating zone the wireless communication device 53 was located within during the call.

In another embodiment, as illustrated with dashed lines, the location information 60 is received by the input/output device 98 and relayed to the processor 100. The processor 100 then requests and receives the current network area definition 62 that is specific to the user or application. The current network area definition is obtained either from the memory 102 or through the input/output device 98. It will be understood that the location-based zone assignment system 52 may include other suitable devices and systems without departing from the scope of the present invention.

Figure 4:
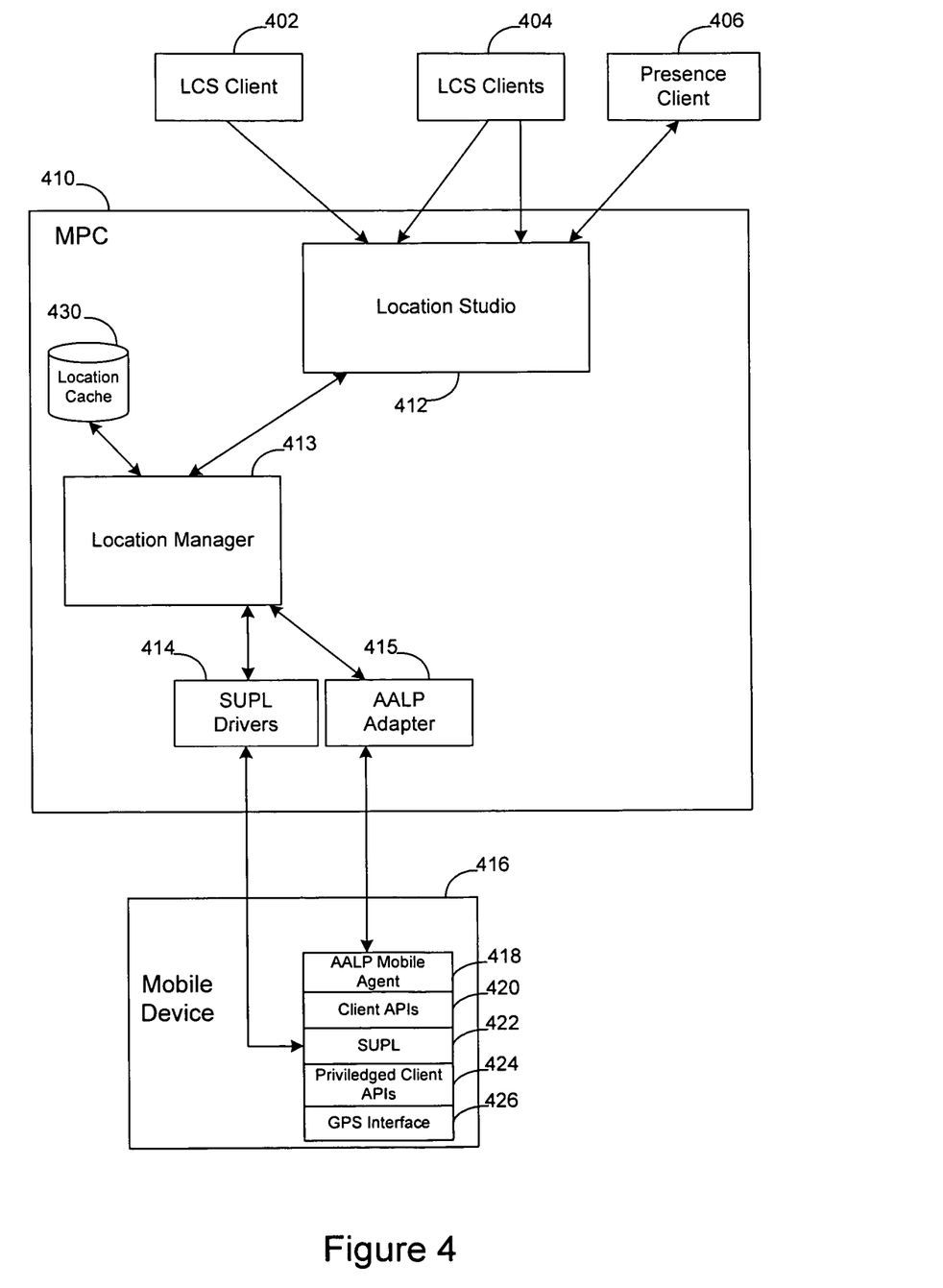
FIG. 4 is a simplified schematic illustration of a system architecture implementation according to an embodiment of the present invention.

FIG. 4 is a simplified schematic illustration of a system architecture implementation according to an embodiment of the present invention. As illustrated in FIG. 4, the architecture includes a mobile positioning center (MPC) 410, which includes Location Studio 412 and Location Manager 413, products available from Openwave Systems Inc., of Redwood City, Calif. Although Location Studio and Location Manager products are illustrated in FIG. 4, embodiments of the present invention do not require these specific implementations. In alternative embodiments, other products adapted to provide for generation and control of location information are utilized. Generally, these products provide privacy and anonymity for the subscribers while enabling commercial location-based services. In some embodiments, the Location Studio and the Location Manager products are combined in the form of a Location Server.

Further, in an embodiment, there may be enhancements to the Location Manager and the Location Studio to support the sophisticated location-based services that are made possible by embodiments utilizing the mobile agent. For instance, mobile location protocol (MLP) compliant triggered location reporting may be added to the MLP interface supported by the Location Manager and the Location Studio. One of ordinary skill in the art would recognize many variations, modifications, and alternatives.

The architecture illustrated in FIG. 4 also incorporates an adaptive autonomous location push (AALP) adapter 415 as an element of the MPC 410. As described more fully below, embodiments of the present invention utilize AALP to enhance support for, for example, tracking applications. Merely by way of example, as illustrated in FIG. 4, the mobile device 416 interacts with the mobile position center through the AALP adapter 415. In a specific embodiment, the mobile device 416 reports its location to the AALP adapter on a periodic basis or based on the distance traveled since last report, or both, and the like. The architecture may be implemented using software located at a wireless base station or connected to communicate with the wireless base station. In some embodiments, the base stations are referred to as servers, and these terms are used interchangeably throughout the specification.

In some embodiments, the AALP adapter communicates with the mobile device or phone via an AALP protocol. Generally, the AALP adapter pushes location updates to the MPC (for example, the Location Manager) and presence updates to the presence server (see discussion related to FIG. 6) via Session-Initiation Protocol (SIP) (i.e., it acts as a presence adapter). Moreover, typically, the AALP adapter sends criteria updates to the mobile device via a protocol, such as a WAP push, SMS, or others, to trigger the mobile device to retrieve new criteria. One of ordinary skill in the art would recognize many variations, modifications, and alternatives.

One benefit provided by embodiments of the present invention is that there are relatively minimal changes in this architecture compared to architectures without AALP. This system architecture may be quickly and easily implemented, at relatively low cost, in order to accommodate one or more mobile devices 416, each with a mobile agent 418. There may be any number of mobile devices coupled to the MPC, and typically there are very many mobile devices in communication with each MPC.

As illustrated in FIG. 4, the mobile device 416 includes an AALP mobile agent 418. Generally, the AALP adapter provided in the MPC is utilized to interface with the AALP mobile agent in the mobile device. Additionally, the mobile device may include other software and hardware elements, including client application program interfaces (APIs) 420, a Secure User Plane for Location (SUPL) interface 422, Privileged Client APIs 424, a GPS interface 426, and the like. The mobile device may also include low level APIs for interacting with the GPS hardware not available to all applications. As will be evident to one of skill in the art, these low level APIs may be provided by the V7 framework or the KVM implementation. In some embodiments, the SUPL driver enhances the MPC to support SUPL-based positioning mobile devices.

In some embodiments according to the present invention, the mobile agent is the agent resident in the mobile device that implements adaptive location monitoring algorithms. As described more fully below, the mobile device may be capable of handling push criteria comparison, thereby interacting with the base station or server side represented by the MPC. In some embodiments, the criteria are configurable and provisioned over the air from a server coupled to the AALP adapter. Criteria may be based on a variety of factors including information contained in a user profile. The information contained in the user profile may be provided and/or updated by a variety of entities. These entities include: a network operator, a content provider, an owner of a mobile device (e.g., a parent of a child using a mobile phone), a user of a mobile device, and the like. Merely by way of example, a content provider may have a contractual right or duty to provide and/or update information in a user profile as a result of a commercial transaction. Characteristics included in a user profile may include age, gender, interests, e-commerce activity, home location, work location, and the like. In a specific embodiment, a content provider may define criteria so that information is pushed to a user depending on the location of the user.

As described throughout the present specification, content is pushed from a service provider to one or more users when criteria are satisfied. The one or more users may be a specific user. In some applications, a number of user profiles are filtered to provide a list of users of interest to a particular content provider. One of ordinary skill in the art would recognize many variations, modifications, and alternatives. As an example of uses of embodiments of the present invention, a network operator may charge commercial entities, for example, a store, for providing a service that pushes advertising and other information to a user based on a user profile, temporal criteria, location criteria, and the like. In this example, the network operator may maintain a user profile for each of a number of users. The commercial entity may then request that the network operator push information to users with profiles matching a given set of parameters. Accordingly, filtering of user profiles is performed by the network operator in response to particular requests. In addition to pushing information to a user, new criteria may be pushed to a user based on filtering of information in a user profile.

The agent may be implemented for mobile device environments such as J2ME MIDP 2.0, BREW, Symbian, V7, and the like. In an embodiment, the mobile agent is software that resides and executes on a wireless phone or other device. This software may be preloaded on the phone or device before purchase, or may be downloaded into the phone after the consumer buys the phone. In another embodiment, the mobile agent is in firmware that resides and executes on a wireless phone. This firmware may be subsequently updated or altered by a consumer or others. For example, the firmware may be updated wirelessly by a mobile phone provider.

As further illustrated in FIG. 4, some embodiments of the present invention provide a location cache 430 as an element of the MPC 410. The location cache interacts with the location manager to cache location information for utilization by the MPC. In an embodiment, there are SUPL drivers 414 to interface between the location manager and the SUPL interface 422 of the mobile device. The SUPL on the phone may include client APIs for location; for example, JSR-179 for Java or V7 for Framework APIs. Of course, as one of skill in the art will appreciate, additional location finding technologies and applications are provided in alternative embodiments. The utilization of SUPL as illustrated in FIG. 4 is not intended to limit embodiments of the present invention, but merely provide an example of a location finding technology. Elements of the MPC, including products such as Location Studio may interface with one or more Location Services (LCS) clients 402, 404, as well as Presence client 406.

In some embodiments, there is an MLP interface between the LCS clients and the Location Studio component. In a specific embodiment, the interface is an Open Mobile Alliance (OMA) standardized MLP interface for location between the LCS client and the location server. In additional embodiments, the MLP interface is extended in a "standard" way to support nonstandard features such as the advanced capabilities of AALP. Under this approach, even presence applications are possibly included, as the line between location and presence becomes a less clear delineation.

In other embodiments, there is an advanced application interface (AAI) between the LCS clients and the Location Studio component. Generally, the AAI interface is a web services interface to the Location Studio. The AAI interface can support messaging, location, and so forth. Additionally, in some embodiments, this interface is extended to support additional features available through AALP applications and presence functions (discussed in relation to FIG. 6).

When deploying wireless systems, there may be enhanced features that the mobile devices (e.g., with mobile agent manager) provides, which the base station system (including LM and LSt) does not yet fully support. When sufficient numbers of users have such devices (e.g., with mobile agent manager) or other factors have been satisfied (such as upgrading or build-out of the system), then the base station or server may be updated to operate software that utilizes more of the features available in the wireless device. Therefore, the system architectures discussed in relation to embodiments of the present invention may be a stage in a deployment of a wireless adaptive autonomous location push system.

In an implementation, servers across a region have the same software. However, in other implementations, not all servers have the same software. Across a region, such as the United States or a continent, there may be subregions with different implementations from each other. For example, some regions may have implementations as shown in FIG. 4, other regions as in FIG. 5 (see below), and still other regions as in FIG. 6 (see below). As described more fully below, the user's phone, including an AALP mobile agent, will be able to operate in all these areas, although not all the possible features available with the phone will be utilized depending on the particular server implementations available in a given location.

As an example, network resident tracking applications are provided by some embodiments according to the present invention. These applications monitor the location of a mobile asset and take action when the mobile asset moves. As an example, the action could be as simple as updating a location on a map or making a log entry. In addition, the action could be more complicated, such as notifying a third party.

In an embodiment of the present invention, location criteria are transmitted from the MPC to the mobile device. For example, in a specific embodiment, location criteria are loaded into the AALP mobile agent 418 through the use of the AALP adapter 415. Location criteria include landmarks, such as a school, a home, an office, a shopping center, and the like. In a particular embodiment, a landmark in the form of a child's school is loaded into the AALP mobile agent of the child's phone by using the AALP adapter. Along with the landmark, an algorithm related to the landmark is provided. Merely by way of example, the algorithm could be activated when the child arrives at the school in the morning. The algorithm may determine the location of the phone on a periodic basis, for example, a 10 minute interval, throughout the course of the day, deactivating at the end of the school day. If the phone (in some embodiments, a proxy for the child) leaves the school during the school day, the algorithm resident in the AALP mobile agent notes the location change and takes further action. As an example, the further action may include the AALP mobile agent beginning to track the location of the phone at an increased frequency, for instance, at 2 minute intervals.

As illustrated in FIG. 4, location protocols, such as SUPL are utilized in some embodiments, although the present invention is not limited to SUPL or other particular location finding protocols. In some embodiments, the location finding protocols will depend on the particular network implementation as will be evident to one of skill in the art. Some embodiments of the present invention conserve system resources by utilizing information associated with the mobile device. Merely by way of example, in a specific embodiment adapted for monitoring a child at school as described above, the mobile unit utilizes information regarding the cell towers in the vicinity of the school to determine the location of the mobile unit when the mobile unit is at the school. By comparing the signals from adjacent cell towers, the mobile unit determines it's location without use of network resources, thereby minimizing system bandwidth. One of ordinary skill in the art would recognize many variations, modifications, and alternatives.

Embodiments of the present invention provide for the use of a number of location finding technologies, both network-based and GPS-based. Continuing with the previous example, if the location of the mobile unit is determined using information regarding the cell towers in the vicinity of the school, the location of the phone is provided with accuracy in a given range. The mobile agent resident in the mobile device may be used in an adaptive manner to determine if the accuracy of the location information is acceptable or if additional resolution is desired. By utilizing this adaptive decision making functionality, network resources may be conserved (e.g., for network-based finding technologies) as well as resources of the mobile unit such as the battery (e.g., for GPS-based finding technologies).

Additionally, the AALP mobile agent may communicate the location change to the MPC through the AALP adapter, which initiates a process of notifying the child's parent or guardian, school personnel, security services, and the like of the location change. In alternative embodiments, the location criteria includes not only a single location, such as the child's school, but a boundary, such as a radius around the school, effectively enabling the child to leave the immediate vicinity of the school without amounting to a location change of significance to the algorithm. Moreover, temporal criteria may be utilized by the algorithm resident in the AALP mobile agent, enabling the child to leave the school during predetermined periods, such as lunch time or during school break periods. Although these examples are provided to illustrate embodiments of the present invention, the present invention is not limited to these particular examples. One of skill in the art will appreciate the numerous actions made possible through the use of the AALP mobile agent and algorithms resident therein.

In some embodiments, criteria are provided in the form of temporal conditions on reporting of location. In these embodiments, the location information may be obtained in a variety of manners, included network-assisted location finding techniques, GPS techniques, and the like. These temporal conditions may be utilized in determining the frequency with which location updates are provided by a mobile unit. Merely by way of example, a client device may determine its location at a predetermined frequency, but not communicate the determined location until one or more criteria are met. Accordingly, embodiments of the present invention reduce the burden on network resources typically used to poll for location information.

Algorithms resident in the AALP mobile agent 418, in conjunction with criteria provided by a wireless network server, are utilized in some embodiments to determine conditions under which the mobile unit utilizes network-based location information services. Thus, network resources are conserved as mobile units utilize network resources in an adaptive manner. Merely by way of example, in one embodiment, temporal and/or spatial criteria are utilized in combination with processors and memory present in the mobile unit 416 to access network-based location services in a manner that minimizes network resources.

Merely by way of example, in a particular embodiment, the mobile unit receives temporal and/or spatial criteria transmitted from the MPC. These criteria may include at least one presence criterion transmitted from a wireless network server. The temporal and/or spatial criteria are stored in one or more memories disposed in the mobile unit. Algorithms are resident in the mobile unit, for example, in AALP mobile agent 418. Such algorithms may be stored in the one or more memories storing the temporal and/or spatial criteria or in other memories provided in the mobile unit. One of ordinary skill in the art would recognize many variations, modifications, and alternatives.

Algorithms resident in the mobile unit utilize the criteria and a characteristic of the mobile unit to determine if one or more of the criteria are satisfied. Requests for location-bases network services will be made depending on the outcome of this determination, thereby conserving network resources. Merely by way of example, a previous location of the mobile unit, stored in a memory, may be utilized to determine if a given presence criterion is satisfied. The presence criterion may include a location and a boundary surrounding the location. If the mobile unit can determine, for instance, based upon a connection to a given cell tower, that the location of the mobile unit is within a radius of the previous location, no location update request will be made to the network. Therefore, although the actual location of the mobile unit may not be known to an accuracy less than the radial location, network resources can be conserved in situations where the general location of the mobile unit is sufficient for a particular application.

Moreover, other criteria, including temporal criteria such as given time periods during the day, may be characterized by more or less frequent location update requests. The algorithm may utilize information stored in the mobile unit in the decision making process, such as times associated with previous location update requests. Thus, the frequency with which location information is requested from the network may be limited in an adaptive manner, conserving network resources. Additionally, for certain locations, the frequency of location update requests may be different than for other locations. Thus, in this example, if the previous location is associated with a first frequency of location update requests, and if the time since the previous location update request is such that the first frequency would be exceeded if an additional location update request is made, the algorithm will be used to limit the frequency of location update requests to maintain a frequency less than the first frequency.

If the algorithm determines that the characteristic of the mobile unit, such as previous location, time since last update, and the like, satisfies the at least one presence criterion, a location update request is transmitted from the mobile unit to the wireless network server, for example, the MPC. Thus, embodiments of the present invention utilize criteria, algorithms, and stored information to adaptively control the use of network resources. The criteria may relate to location accuracy, network bandwidth, location update frequency, combinations of these, and the like.

Location criteria are not limited to landmarks, but may include temporal constraints associated with landmarks. As illustrated in the previous example, temporal criteria may define the times during which the algorithm is active, the periodicity of location finding activities, variations in such periodicities, and the like. Moreover, in alternative embodiments, location criteria include criteria unassociated with a particular location. For example, in another embodiment, the algorithm resident in the mobile agent operates to provide location information for the mobile device at a periodicity that depends on the velocity of the mobile device.

According to embodiments of the present invention, when the mobile agent detects its current location meets one of its push criteria it pushes its location to the Location Manager for subsequent distribution to interested applications. The criteria used to trigger a location push would include: (1) time (e.g., time since last report, specific time events), (2) distance traveled since last report, (3) entry or exit of a geographic region (e.g., polygonal boundary comparison), (4) proximity to a landmark (e.g., home, school, or office), (5) cell or sector change.

Merely by way of example, an illustration of an AALP application is fleet management. Considering a taxi fleet with mobile devices in each vehicle as an example, the AALP mobile agent could track the vehicle location, providing updates to the MPC at a rate dependent upon the motion of the vehicle. For instance, when the taxi is stopped, waiting for a fare, the AALP mobile agent will check location status, for example, by determining the identity of the cell tower or station with which the phone is in communication, but not provide any updates to the MPC. The location status could be checked at a periodicity of once per minute, more frequently, or less frequently. When a fare is picked up and the vehicle begins to move, the AALP mobile agent can determine that the taxi is moving and communicate this information to the MPC. As the velocity of the taxi increases, the frequency with which the location status is checked and updated can be increased, effectively providing location updates to the MPC characterized by approximately constant distances between updates. In this manner, a fleet manager could be provided with status information on vehicles in the fleet, but using communications bandwidth in an efficient manner. Since, in this example, no communication between the mobile device and the AALP adapter is performed when the vehicle is stationary, and only increases in frequency as the vehicle velocity increases, system bandwidth is conserved.

According to embodiments of the present invention, location information is provided to the mobile device or obtained by the mobile unit in a variety of ways. For example, the mobile device may obtain location information in several ways (e.g., network-assisted location finding techniques, GPS techniques, identity of a corresponding cell tower or station, and the like). This location information may be stored in one or more memories provided in the mobile device. Accordingly, a "last location" is available to the mobile device. A variety of inputs may be used to initiate a process for updating the location information for the mobile device. Merely by way of example, temporal criteria (e.g., a timer that provides an indication if the location has not been updated within a predetermined time period) may be used to initiate a process for updating location information. The predetermined time period may be set in a number of ways by the use of the mobile device or other entities. Additionally, by way of example, signal strength and/or cell tower identity may be utilized to determine when the mobile unit is in communication with a new cell tower, GPS information obtained by the mobile unit, or other triggers may be used to initiate a process for updating location information.

According to embodiments of the present invention, the inputs described above are not limited to the area of mobile device communication networks, i.e., cellular networks. Other mobile communication networks may provide such inputs. As an example, signals from a wireless network such as an 802.11b/g network may be utilized according to embodiments of the present invention. For example, when a user with a mobile device enters a business operating an 802.11 network, the AALP Mobile Agent may be triggered, resulting in a communication to the MPC that results in a coupon for the particular business establishment being provided to the mobile device. Thus, entering the service area of the 802.11 network results in an autonomous and adaptive request for information based on the location of the mobile device.

In another alternative embodiment, the algorithm present in the AALP mobile agent serves to monitor a vehicle's location, providing location updates to the MPC as a function of distance from a landmark. Merely by way of example, a person may want to receive location updates at an increasing frequency as a mobile unit approaches a landmark. In an embodiment, the updating frequency increases as the distance from the mobile unit to the landmark decreases. In this manner, as the mobile unit, for example, carried by a person, approaches the landmark, for example, an intersection of two roads, the frequency at which location information is updated increases. As an example, in an application that provides travel directions, a low updating frequency is provided as a person travels down an interstate highway, with a considerable distance before the next turn. As the person approaches the turn, the updating frequency increases as the landmark is reached.

In embodiments according to the present invention, the algorithm resident in the mobile agent is adaptive, providing location updates as a function of both criteria (including time of day, distance from a location, speed, and the like) and specific circumstances. Generally, circumstances are the present or current value of a selected criterion. Thus, for a criteria such as time of day, the circumstance could be an hour and minute, morning or afternoon, and the like.

Utilizing adaptive algorithms, numerous applications are provided. Preferably, the algorithms in the mobile agent are adaptive and tunable so that the MPC can effectively monitor the mobile device's location while making efficient and sparing use of network resources such as PDE and radio capacity. As illustrated by the examples discussed throughout the present specification, the algorithms can adapt to monitor location more or less frequently and accurately based on: (1) velocity, (2) proximity to a geographic region or landmark, (3) quality of service (QoS) desired by the end users or required by the application, (4) restrictions on the frequency of location reports (e.g., no more than N reports in a given time span), and the like.

The adaptive algorithms in the mobile agent may avoid GPS fixes entirely when location derived from cell information indicates sufficient distance from a proximity-based trigger such as a landmark. For example, in one exemplary network, the J2ME API for location allows access to the latitude and longitude of the serving cell. This is also true of the BREW APIs for location supported in CDMA phones using Qualcomrnm's location technology. While this information gives only an approximation of the mobile's location, this should be sufficient in many instances to determine what the distance from a landmark is, so no GPS fix is necessary. This would save PDE, radio network, battery resources, and the like.

Thus, embodiments of the present invention provide adaptive functionality by both obtaining and utilizing location information adaptively. For example, the mobile agent may utilize algorithms and criteria to determine when to obtain location information. Thus, network resources are conserved when the number of network-based location information requests are reduced. Also, the mobile agent may utilize algorithms and criteria to determine when to provide location information to the network. For example, depending on the location, time, and other criteria, a mobile unit may notify the network of proximity to a landmark and receive advertising or other information in response to this location information.

As an example, in a particular embodiment, no location updating is provided while the mobile unit is traveling at a velocity less than a threshold value, for example, 65 miles per hour. An algorithm resident in the mobile agent monitors the position of the mobile unit as a function of time, calculating the velocity and comparing the result to the predefined threshold. If the threshold velocity is exceeded, a notification can be provided to a user, for example, a parent or guardian of a child with the mobile unit. Fleet applications might provide notification to a dispatcher or vehicle owner. As will be evident to one of skill in the art, the threshold value may be a function of position, varying according to the location (city vs. country, surface streets v. highway, and the like), time of day (lower threshold velocities at night), weather conditions, combinations of these conditions, and the like. One of ordinary skill in the art would recognize many variations, modifications, and alternatives.

Figure 5:
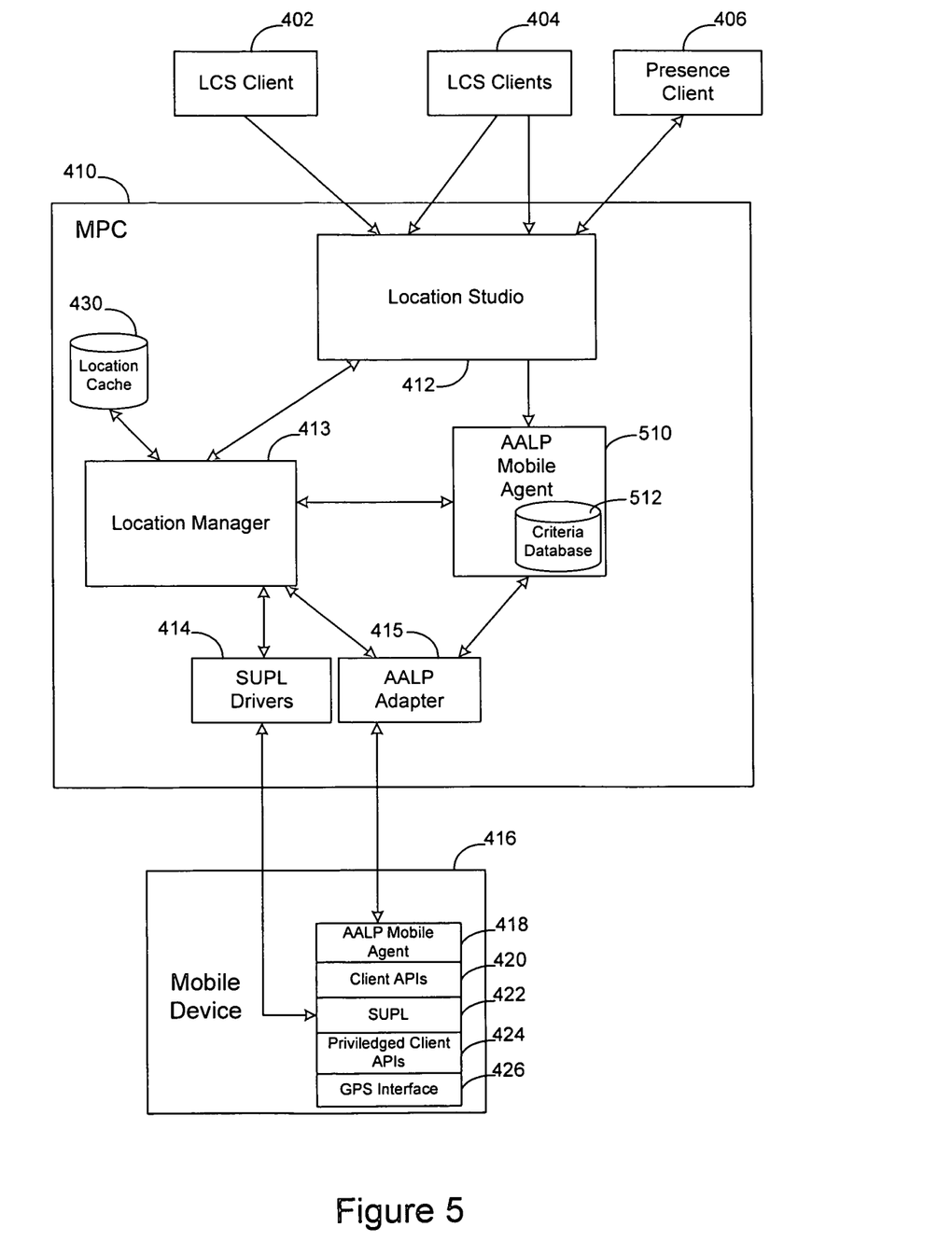
FIG. 5 is a simplified schematic illustration of another system architecture implementation according to an embodiment of the present invention.

FIG. 5 is a simplified schematic illustration of another system architecture implementation according to an embodiment of the present invention. The implementation illustrated in FIG. 5 builds upon the implementation of FIG. 4, including an AALP mobile agent manager 510, responsible for managing a criteria database 512 and downloading it to the mobile devices. The mobile agent manager is connected to the Location Studio, the Location Manager, and AALP adapter components.

In an embodiment, the mobile agent manager 510 is a server for mobile agent management. Generally, the mobile agent manager is responsible for management of the location push and presence push criteria (discussed in relation to FIG. 6) downloaded to the phone. The mobile agent manager may also be responsible for consolidating the criteria of various applications and downloading them to the phone. As illustrated in FIG. 5, this server generally maintains information in the criteria database 512 particular for each mobile device and downloads the criteria to the mobile device. Of course, some information in the criteria database 512 may be relevant to all mobile devices, or groupings of mobile devices (e.g., information related to a specific model or range of models). In the embodiment illustrated in FIG. 5, the criteria are downloaded through the AALP adapter 415. Generally, particular criteria associated with a specific mobile device is loaded into the criteria database by methods well known to one of skill in the art. Typically, support to allow applications to load their own criteria (such as geographic regions) is included in implementations provided by embodiments of the present invention.

By incorporating support for sophisticated criteria (such as landmarks), the architecture illustrated in FIG. 5 delivers support for a wide variety of applications. These applications include applications such as push advertising, child finder, and the like. For example, a child finder service could register for location updates from the MPC 410 and request to be notified when a particular mobile device (typically associated with the child) leaves the proximity of a landmark (e.g., the school). The AALP mobile agent manager 510 pushes the criteria down to the handset or mobile device. As illustrated in FIG. 5, the communications path illustrated as passing through the AALP adapter is utilized, although this is not required by the present invention. The mobile device will then monitor its location and notify the Location Manager 413 when it leaves the proximity of the landmark. In turn, the Location Manager will notify the child finder service. This avoids the child finder application periodically polling for the location of each of the handsets or mobile units it is tracking.

Similarly, a push advertising application could register for the location updates and request to be notified when particular mobile devices enter the proximity of a location of interest, for example, a shopping mall or a restaurant. Again, the handsets monitor their location and notify the Location Manager when proximity to the landmarks of interest (e.g., the shopping mall) is detected. In some embodiments, this location monitoring includes providing different notifications as a function the distance to the landmark. Merely by way of example, as the mobile device comes within a first proximity to a shopping mall, general advertising or other mall-specific information related to the shopping mall, such as hours of operation and mall-wide specials could be pushed to the mobile device. Additionally, in some embodiments, the frequency with which the location information is updated to the Location Manager is a function of distance from the landmark, for example, increasing in frequency as the mobile unit approaches the shopping mall.

As the mobile device comes within a second, closer proximity to the shopping mall, advertisements for particular stores or products could be pushed to the mobile device. One of ordinary skill in the art would recognize many variations, modifications, and alternatives. Embodiments of the present invention avoid wasteful polling of the network for the location of a large number of mobile devices and reduces the system bandwidth utilized for the provision of services such as push advertising.

It will be appreciated that not only is the delivery of information to the mobile unit, such as advertising, performed in an adaptive manner, but the requests for location information are also adaptive according to embodiments of the present invention. Continuing with the previous example, location monitoring by the mobile unit may be a function of position. Thus, in areas with low population density, location update requests may be made with a low frequency, since the number of landmarks will generally be lower than in densely populated areas. As the mobile unit approaches a more densely populated area, the frequency may increase as appropriate to a closer proximity to a number of advertisers. Of course, temporal conditions may also be used, alone or in conjunction with spatial conditions, to request location information in an adaptive manner.

Figure 6:
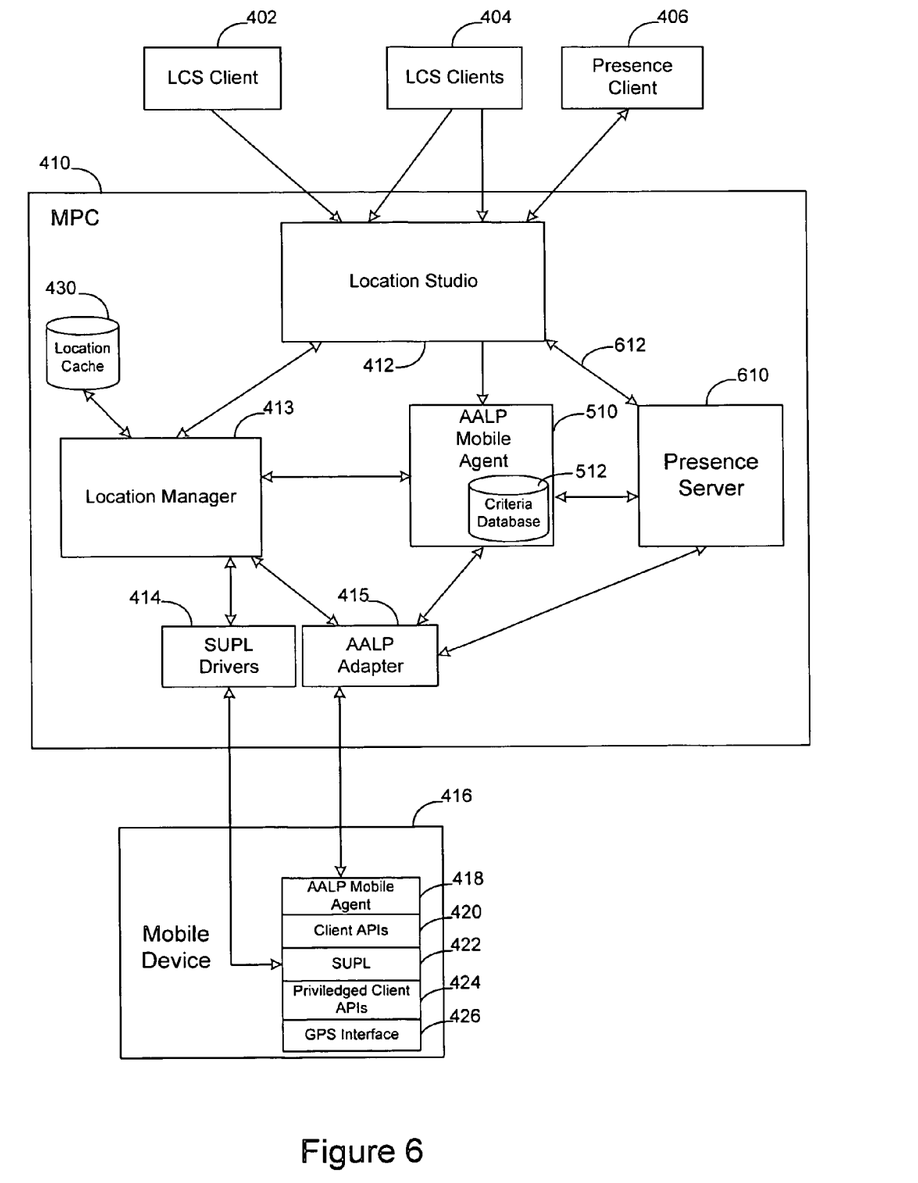
FIG. 6 is a simplified schematic illustration of yet another system architecture implementation according to an embodiment of the present invention.

FIG. 6 is a simplified schematic illustration of yet another system architecture implementation according to an embodiment of the present invention. The implementation illustrated in FIG. 6 continues to build upon the implementation of FIG. 5, including a Presence Server 610. In some embodiments, the presence server 610 enables additional generic and powerful presence functions. In this architecture, the mobile device with the mobile agent becomes a presence source and the presence server 610 makes this presence information available via standard SIP-based presence protocols. Generally, these applications monitor the location of a subscriber as a way to infer presence. For example, that a child is at school or that a consumer is at the mall.

Generally, when presence applications are implemented using embodiments employing AALP, the tracking applications will register with the location server (e.g., the MPC) for location updates based on criteria. Typically, the criteria would be proximity to a geographic region or a landmark. Then the tracking application waits until it receives notification of an interesting event. The Location Manger or Presence Server will download enough information (e.g., event reporting criteria) to the mobile agent resident in the mobile device such that the mobile device can monitor its location against the criteria and push its location or presence status to the MPC when the criteria is met. When implemented via AALP, the algorithms for location and presence monitoring adapt to the needs of the applications.

In some embodiments, there is an SIP interface 612 between the presence server 610 and the Location Studio 412 component. As is well known to one of skill in the art, SIP is a protocol used for presence applications. Typically, Location Studio uses this register for presence updates on behalf of LCS Clients. It can also be used by the presence server to send presence data to Location Studio.

For example, landmark criteria could be downloaded to the mobile device representing the subscriber's home and office, the children's school, and the like. As the subscriber moves about between these well-known locations the mobile device could update the presence server to indicate "at home," "at work," or "at school." Again, needless and wasteful polling of the network for the subscriber's location is avoided, as well as unnecessary reverse geo-coding operations. Moreover in some embodiments, criteria in addition to landmark criteria are downloaded to the mobile agent. For example, criteria including permissions and contact rules are downloaded in a particular embodiment. In this particular embodiment, when a mobile device indicates that it is at the "home" location, permissions may be given to receive personal calls. In another embodiment, a contact rule, such as no calls after 11 p.m. or automatic forwarding to voice mail, could be instituted when the mobile device is at the "home" location.

AALP enables location products (such as those provided by Openwave Systems Inc. or other manufactures) to efficiently support ubiquitously available, heavily utilized commercial location-based services requiring high accuracy. The mobile agent component of AALP autonomously monitors its location and pushes it to a Location Manager when required. This eliminates the need for expensive, inefficient, and possibly time-consuming polling for location, which is generally impractical to support these types of services. The ability of the mobile agent to efficiently support many types of push criteria also increases the types of location-based applications supported. For example, push criteria based on geographic regions allows for push advertising and child monitoring types of services according to embodiments of the present invention. The ability of the Location Manager and the mobile agent to consolidate reporting criteria from multiple applications provides additional opportunities to optimize the utilization of network resources. With AALP, a MPC, generally including a Location Manager and a Location Studio or similar products, are enhanced and facilitate commercial location-based services made possible by the advent of smart phones.

What is considered a "smart phone" may be somewhat subjective, but features of a smart phone may include a (1) fast processor, (2) software application extensibility, (3) large and possibly expandable memory, (4) high quality color display, and (5) advanced IP networking capabilities over high-speed telephony networks such as 2.5 G or 3 G. As will be evident to one of skill in the art, "smart phones" may include additional features not listed and/or may not include all the features listed above.

Beyond just the basic numbers for handset shipments, the smart phone market is important because it is generally a revenue growth focus for mobile operators. Because smart phone users typically expect (and pay for) premium services above and beyond basic voice service, they are a valuable market and source of revenue growth for the operators. Of course, it follows that the operators will attempt to supply advanced services which leverage the capabilities of the smart phones to appeal to these users. Location-based and location-enhanced applications are a natural choice for these applications. As smart phones become more prevalent, AALP can be sold to existing customers as an upgrade to the capabilities of their current MPC installations. It will be easy to upgrade the MPC to support this feature, and the mobile agent itself will typically be a downloadable application in Java, BREW, Symbian, or other environments.

The mobile agent may be supported on various smart phone platforms including J2ME MIDP 2.0, Symbian, BREW, V7, and Microsoft platforms. Additionally, the interface through which location-based applications can exploit the capabilities of a smart phone may be via standardized interfaces, such as either MLP or OpenLS based interfaces. Of course, the present invention is not limited to these platforms.

As discussed above, the mobile agent is provided as a component of implementations including AALP applications. Generally, AALP leverages the increasing capabilities of cellular phones to enable more powerful and compelling location-based applications. In some embodiments, the mobile agent present in the mobile device is responsible for autonomously monitoring its location using adaptive algorithms and comparing the location against a downloaded database of push criteria. In addition to this, as described in reference to FIG. 6, the mobile agent could also be used to deliver presence information.

In a further embodiment of the invention, AALP may be linked to wireless application protocol (WAP) push. For example, a service, such as advertising or couponing, could send a WAP push to the mobile device and specify some parameters such as (x, y) coordinates and radius, time to live, and display time window (put it in the URL). If or when these conditions are met, the WAP push is activated and an ad or the like is displayed to the user. In an implementation, when the WAP push message is sent to the mobile device, it would "register" its location requirements and other parameters with the mobile agent. The mobile agent could then "activate" the WAP push message if or when the parameters or conditions are met. Accordingly, embodiments of the present invention reduce the load on the server and on the wireless network resources.

According to embodiments of the present invention, methods and techniques are provided in which a mobile device, operating in an autonomous manner, receives and stores one or more criteria used in adaptively providing location-based information and services. Utilizing these criteria, the mobile device is adapted to receive location information from a variety of sources and utilize such location information to adaptively push the location information for the mobile device to other network components. In response, information including advertisements, coupons, business information, and the like, are transmitted to the mobile device. Thus, embodiments of the present invention reduce the need for resource-intensive polling as well as transmission of information not useful to the mobile device.

Location information is obtained by the mobile device in a number of ways according to embodiments of the present invention (e.g., network-assisted location finding techniques, GPS techniques, identity of a corresponding cell tower or station, and the like). Utilizing one or more criteria stored in the mobile device as described more fully throughout the present specification, algorithms resident in the mobile device are utilized to determine when the location of the mobile unit is pushed to the network. Thus, in an application directed to conserving network and mobile device resources, a mobile device may monitor a cell tower in which the mobile device is in communication and not request any network-based location information updates or provide any location information updates to the network until the cell tower identity changes. Thus, for example, while a user with a mobile device is at a work location during the day, both device and network resources are conserved.

Upon determining that one or more of the criteria are satisfied, the mobile device pushes location information to the network or requests location information from the network in an adaptive manner. This push of location information enables the network to respond with information particularly appropriate for the location and circumstances of the mobile device. Merely by way of example, a restaurant may provide criteria including hours of operation, location, and customer demographics. When a user with a mobile device enters a vicinity of the restaurant during appropriate hours, the location of the mobile device is pushed to the network, which then provides an appropriate advertisement or coupon to the mobile device. In this example, up-to-date advertisements are provided to the mobile unit in response to the location information, reducing the use of network resources while tailoring the advertisements or coupons to the characteristics of the mobile user.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

What is claimed is:

1. A method of providing location-based services, the method comprising:
   receiving a first location criterion from a server at a wireless device;
   receiving a second location criterion from the server at the wireless device;
   evaluating whether a physical location of the wireless device satisfies the first location criterion and whether the physical location of the wireless device satisfies the second location criterion, wherein the evaluating is performed by the wireless device;
   when the first location criterion is satisfied, transmitting a first indication from the wireless device to the server that the first location criterion has been satisfied;
   after transmitting the first indication to the server that the first location criterion has been satisfied, receiving a first message from the server at the wireless device;
   when the second location criterion is satisfied, transmitting a second indication from the wireless device to the server that the second location criterion has been satisfied; and
   after transmitting the second indication to the server that the second location criterion has been satisfied, receiving a second message from the server at the wireless device, wherein the second message is different from the first message;
   wherein the evaluation is repeated by the wireless device at a first frequency and wherein the frequency of the evaluation is changed to a second frequency in response to at least one of a temporal criterion and a spatial criterion, wherein each of the first frequency and the second frequency defines a number of evaluations per unit time.

2. The method of claim 1 wherein the first location criterion is satisfied when the wireless device leaves a proximity of a landmark.

3. The method of claim 1 wherein the first location criterion is satisfied when the wireless device is within a proximity of a landmark.

4. The method of claim 1 wherein the first location criterion is satisfied when the wireless device leaves a proximity of a first landmark, and the second location criterion is satisfied when the wireless device leaves a proximity of a second landmark.

5. The method of claim 1 wherein the first location criterion is satisfied when the wireless device leaves a proximity of a first landmark, and the second location criterion is satisfied when the wireless device is within a proximity of a second landmark.

6. The method of claim 1 wherein the first location criterion is satisfied when the wireless device is within a proximity of a first landmark, and the second location criterion is satisfied when the wireless device is within a proximity of a second landmark.

7. The method of claim 1 wherein the wireless device evaluates whether a physical location of the wireless device satisfies the first location criterion without polling the server.

8. A method of operating a wireless device, the method comprising:
   receiving a first landmark criterion transmitted from a server to the wireless device;
   receiving a second landmark criterion from the server at the wireless device;
   determining that a physical location of the wireless device satisfies the first landmark criterion or that the physical location of the wireless device satisfies the second landmark criterion, wherein the determination is made by the wireless device; and
   when it is determined that the first landmark criterion is satisfied, transmitting a first indication from the wireless device to the server;
   receiving a first message transmitted from the server to the wireless device after transmitting the first indication;
   when it is determined that the second landmark criterion is satisfied, transmitting a second indication from the wireless device to the server;

receiving a second message transmitted from the server to the wireless device after transmitting the second indication, wherein the second message is different from the first message;

wherein the determination is repeated by the wireless device at a first frequency and wherein the frequency of the determination is changed to a second frequency in response to at least one of a temporal criterion and a spatial criterion, wherein each of the first frequency and the second frequency defines a number of determinations per unit time.

9. The method of claim 8 wherein the server comprises a mobile agent manager server.

10. The method of claim 9 wherein a presence server is coupled to the mobile agent manager server.

11. The method of claim 8 wherein determining is performed utilizing one or more algorithms resident in the wireless device.

12. The method of claim 8 wherein the server is a presence server.

13. The method of claim 8 wherein the first message comprises advertising content.

14. The method of claim 8 further comprising maintaining an indication of a last location transmitted to the server in a memory disposed in the wireless device.

15. A system comprising:
a location manager operating unit;
a mobile device that includes a mobile agent manager operating unit, communicating with the location manager operating unit, wherein the mobile agent manager operating unit comprises location criteria; and
a presence server operating unit, communicating with the mobile agent manager operating unit, wherein the presence server operating unit receives presence information from the mobile device, and transmits location presence information to the location manager operating unit;
wherein the mobile device
evaluates whether the mobile device is in a location satisfying a first location criterion provided to the mobile device and whether the mobile device is in a location satisfying a second location criterion provided to the mobile device; and
transmits a first indication that the first location criterion is satisfied if the mobile device determines that the mobile device is in a location that satisfies the first location criterion; and
transmits a second indication that the second location criterion is satisfied if the mobile device determines that the mobile device is in a location that satisfies the second location criterion;
wherein the presence server operating unit transmits a first message to the mobile device after receiving the first indication and transmits a second message to the mobile device after receiving the second indication, wherein the second message is different from the first message; and
wherein the evaluation is repeated by the mobile device at a first frequency and wherein the frequency of the evaluation is changed to a second frequency in response to at least one of a temporal criterion and a spatial criterion, wherein each of the first frequency and the second frequency defines a number of evaluations per unit time.

16. The system of claim 15 wherein the mobile device comprises at least one of a wireless telephony device, personal digital assistant, watch, automobile, airplane, or maritime vessel.

17. The system of claim 15 wherein the mobile agent manager operating unit is resident on the mobile device.

18. The system of claim 15 wherein the temporal criterion comprises a time of day.

19. A method of providing location-based services, the method comprising:
receiving a first presence criterion from a server at a wireless device;
receiving a second presence criterion from the server at the wireless device;
at the wireless device, evaluating whether a characteristic of the wireless device satisfies the first presence criterion and whether a characteristic of the wireless device satisfies the second presence criterion using an algorithm resident on the wireless device;
at the wireless device, determining that the characteristic of the wireless device satisfies the first presence criterion;
transmitting a first indication from the wireless device to the server based on determining that the characteristic of the wireless device satisfies the first presence criterion;
after transmitting the first indication, receiving a first message from the server at the wireless device;
at the wireless device, determining that the characteristic of the wireless device satisfies the second presence criterion;
transmitting a second indication from the wireless device to the server based on determining that the characteristic of the wireless device satisfies the second presence criterion;
after transmitting the second indication, receiving a second message from the server at the wireless device, wherein the second message is different from the first message;
wherein the first presence criterion and the second presence criterion are location criteria specifying a respective location; and
wherein the evaluating is repeated at the wireless device at a first frequency and wherein the frequency of the evaluation is changed to a second frequency in response to at least one of a temporal criterion and a spatial criterion, wherein each of the first frequency and the second frequency defines a number of evaluations per unit time.

20. The method of claim 19 wherein the temporal criterion is a time of day.

21. The method of claim 19 wherein the algorithm is adaptive.

22. The method of claim 21 wherein evaluating is performed in a repeated manner as a function of a circumstance associated with the first presence criterion or the second presence criterion.

23. The method of claim 22 wherein the circumstance associated with the first presence criterion or the second presence criterion is at least one of a velocity of the wireless device or a position of the wireless device.

24. The method of claim 22 wherein the circumstance associated with the first presence criterion or the second presence criterion is a time of day.

25. The method of claim 19 wherein the presence criterion includes a location and a boundary surrounding the location.

26. A method of operating a mobile unit, the method comprising:
receiving a first presence criterion transmitted from a server to a mobile unit, wherein the mobile unit comprises a wireless device;
storing the first presence criterion in a memory disposed in the mobile unit;
receiving a second presence criterion transmitted from the server to the mobile unit;
storing the second presence criterion in the memory;

determining whether a characteristic of the mobile unit satisfies the first presence criterion using an algorithm disposed in the mobile unit, wherein the determination is made by the mobile unit;

transmitting a first location update request from the mobile unit to the server based on the determining whether the characteristic of the mobile unit satisfies the first presence criterion;

determining whether the characteristic of the mobile unit satisfies the second presence criterion using the algorithm disposed in the mobile unit, wherein the determination is made by the mobile unit; and transmitting a second location update request from the mobile unit to the server based on the determining whether the characteristic of the mobile unit satisfies the second presence criterion;

wherein the determination is repeated by the mobile unit at a first frequency and wherein the frequency of the determination is changed to a second frequency in response to at least one of a temporal criterion and a spatial criterion, wherein each of the first frequency and the second frequency defines a number of determinations per unit time.

27. The method of claim 26 wherein the characteristic of the mobile unit comprises a location of the mobile unit.

28. The method of claim 26 wherein the characteristic of the mobile unit comprises a time delay measured from a previous location update request.

29. The method of claim 26 wherein the temporal criterion is a time of day such that the frequency of evaluation is changed in response to the time of day.

30. The method of claim 26 wherein the spatial criterion is a proximity to a geographical region or a landmark such that the frequency of evaluation is changed in response to the proximity to the geographical region or the landmark.

* * * * *